US012647893B2

(12) United States Patent
Sun et al.

(10) Patent No.: US 12,647,893 B2
(45) Date of Patent: Jun. 2, 2026

(54) METHOD AND SYSTEM FOR FAST NETWORK RECONNECTION

(71) Applicant: Beken Corporation, Shanghai (CN)

(72) Inventors: Rongrong Sun, Shanghai (CN); Linwei Yuan, Shanghai (CN); Chunjian Tian, Shanghai (CN); Gang Peng, Shanghai (CN)

(73) Assignee: Beken Corporation, Shanghai (CN)

( * ) Notice: Subject to any disclaimer, the term of this patent is extended or adjusted under 35 U.S.C. 154(b) by 296 days.

(21) Appl. No.: 18/648,607

(22) Filed: Apr. 29, 2024

(65) Prior Publication Data

US 2025/0294460 A1 Sep. 18, 2025

(30) Foreign Application Priority Data

Mar. 12, 2024 (CN) .......................... 202410282411.8

(51) Int. Cl.
| | |
|---|---|
| *H04W 52/02* | (2009.01) |
| *H04L 61/4511* | (2022.01) |
| *H04L 61/5014* | (2022.01) |
| *H04W 76/15* | (2018.01) |

(52) U.S. Cl.
CPC ..... *H04W 52/0235* (2013.01); *H04L 61/4511* (2022.05); *H04L 61/5014* (2022.05); *H04W 52/0274* (2013.01); *H04W 76/15* (2018.02)

(58) Field of Classification Search
None
See application file for complete search history.

(56) References Cited

U.S. PATENT DOCUMENTS

| | | | | |
|---|---|---|---|---|
| 7,885,639 | B1 * | 2/2011 | Satish | H04W 12/122 |
| | | | | 455/410 |
| 11,175,868 | B2 * | 11/2021 | Ueno | H04N 1/00896 |
| 2017/0079078 | A1 * | 3/2017 | Wang | H04L 12/06 |
| 2021/0105632 | A1 * | 4/2021 | Pazhyannur | H04W 16/14 |
| 2022/0303889 | A1 * | 9/2022 | Jiang | G06F 21/608 |

* cited by examiner

*Primary Examiner* — Hong S Cho

(74) *Attorney, Agent, or Firm* — Schwegman Lundberg & Woessner, P.A.

(57) ABSTRACT

The present disclosure address systems and methods for fast reconnection of Internet of Things (IoT) devices to a previously connected Access Point (AP). The method may include storing network parameters of the AP, including a service set identifier (SSID) and a channel, in a memory of the IoT device during the first connection, entering a power saving mode to terminate the first connection with the AP, changing from the power saving mode to a wakeup mode, listening in the stored channel while operating in the wakeup mode until a Beacon signal is received or a predetermined time duration has passed, upon receiving the Beacon signal, comparing the stored SSID with an SSID contained in the Beacon signal; and in response to a comparison result that the stored SSID matches with the SSID contained in the Beacon signal, establishing a second connection with the AP based on the Beacon signal.

20 Claims, 8 Drawing Sheets

400

400

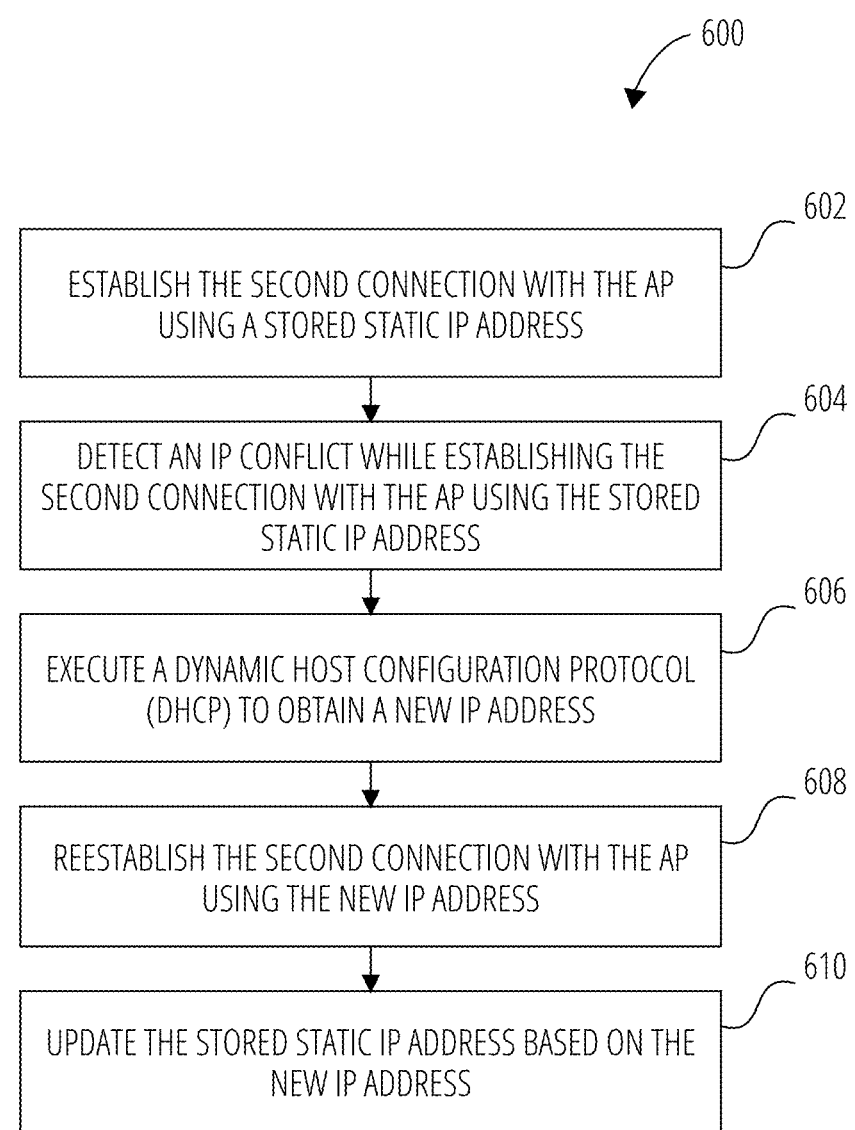

600

602
ESTABLISH THE SECOND CONNECTION WITH THE AP USING A STORED STATIC IP ADDRESS

604
DETECT AN IP CONFLICT WHILE ESTABLISHING THE SECOND CONNECTION WITH THE AP USING THE STORED STATIC IP ADDRESS

606
EXECUTE A DYNAMIC HOST CONFIGURATION PROTOCOL (DHCP) TO OBTAIN A NEW IP ADDRESS

608
REESTABLISH THE SECOND CONNECTION WITH THE AP USING THE NEW IP ADDRESS

610
UPDATE THE STORED STATIC IP ADDRESS BASED ON THE NEW IP ADDRESS

FIG. 6

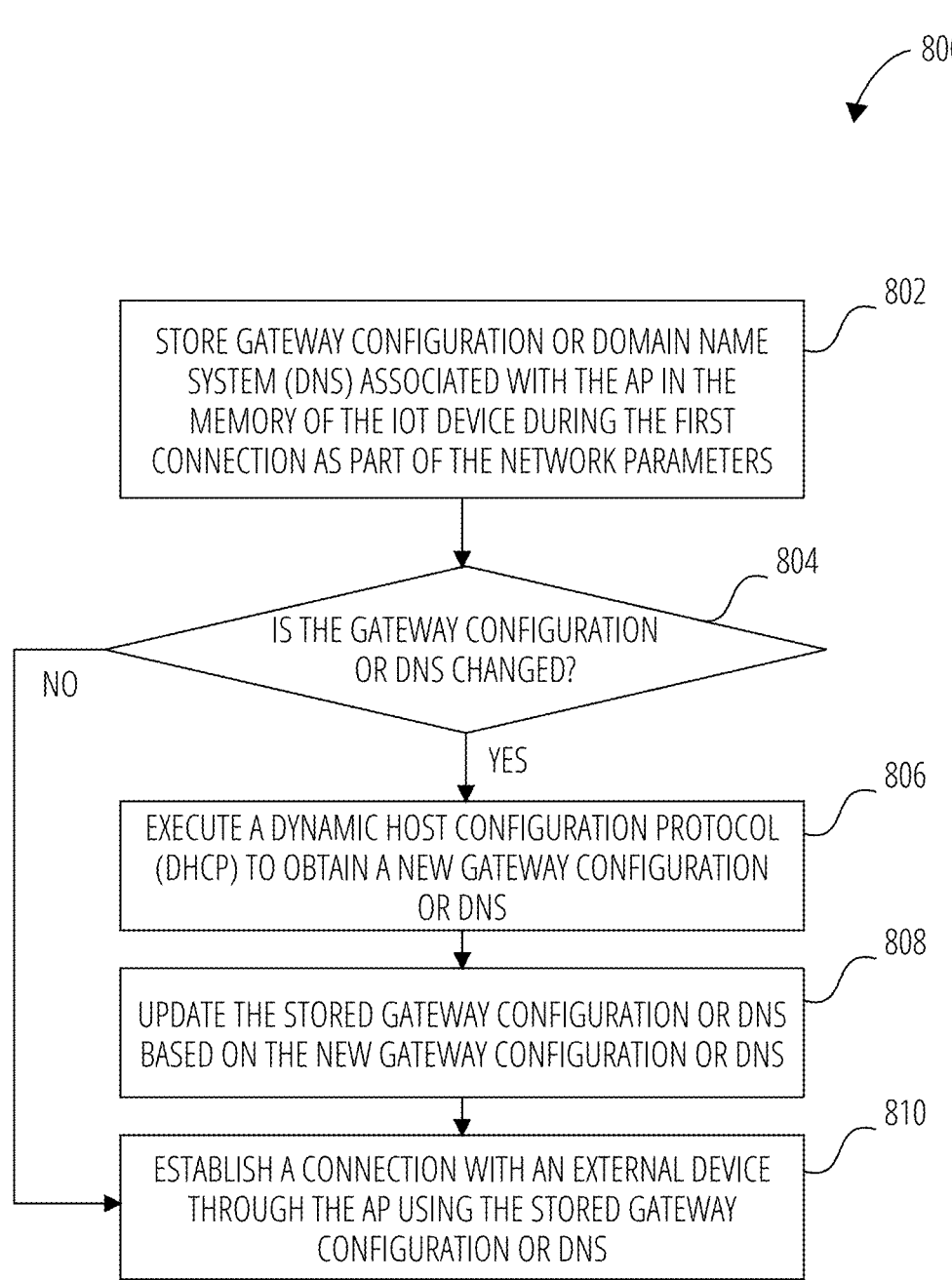

800

802

STORE GATEWAY CONFIGURATION OR DOMAIN NAME SYSTEM (DNS) ASSOCIATED WITH THE AP IN THE MEMORY OF THE IOT DEVICE DURING THE FIRST CONNECTION AS PART OF THE NETWORK PARAMETERS

804

IS THE GATEWAY CONFIGURATION OR DNS CHANGED?

NO

YES

806

EXECUTE A DYNAMIC HOST CONFIGURATION PROTOCOL (DHCP) TO OBTAIN A NEW GATEWAY CONFIGURATION OR DNS

808

UPDATE THE STORED GATEWAY CONFIGURATION OR DNS BASED ON THE NEW GATEWAY CONFIGURATION OR DNS

810

ESTABLISH A CONNECTION WITH AN EXTERNAL DEVICE THROUGH THE AP USING THE STORED GATEWAY CONFIGURATION OR DNS

FIG. 8

METHOD AND SYSTEM FOR FAST NETWORK RECONNECTION

CROSS REFERENCE TO RELATED APPLICATION

This application claims priority to and incorporates by reference Chinese patent application no. 202410282411.8 filed 12 Mar. 2024.

TECHNICAL FIELD

The present disclosure generally relates to wireless communication. In particular, example embodiments of the present disclosure address systems and methods for fast wireless reconnection to a previously connected device.

BACKGROUND

An Internet of Things (IoT) system includes a network of physical objects (referred to as "smart devices" or "IoT devices") that are embedded with sensors, software, and other technologies for enabling connection and exchange of data with other devices via the Internet. For example, IoT devices are used in home automation to control lighting, heating and air conditioning, media and security systems, and camera systems. The IoT devices collect and share data over the Internet to provide advanced functionality that goes beyond standalone devices.

When an IoT device is not active, it typically enters a low-power sleep mode to conserve energy. During this sleep mode, the IoT device deactivates power-draining components such as a wireless networking module (e.g., transceiver), a processor, and/or sensors. Accordingly, when a user attempts to use the sleeping IoT device, such as to press a smart call button to communicate with an indoor receiver or a remote user device, there is often a latency in reactivating and reconnecting to the Access Point, AP. For example, after waking up from the sleep mode or rebooting, the IoT device usually performs a full-channel scan to discover the previously connected AP and calculate a Pre-Shared Key (PSK) to re-authenticate the wireless connection. Once connected with the AP, the IoT device may execute a Dynamic Host Configuration Protocol (DHCP) to determine IP address and other parameters. The full-channel scan takes around 500 ms, the calculation of PSK takes around 2.2 s, and the DHCP takes around 500 ms. With these steps, the total delay before the IoT device can reconnect to the network and respond may exceed 3 seconds, leading to a poor user experience.

Therefore, a method for fast network reconnection (e.g., within or around 500 ms) is desirable.

SUMMARY

In one aspect, a method at an Internet of Things (IoT) device for network reconnection is provided. The method may include establishing a first connection with an Access Point (AP), storing network parameters of the AP in a memory of the IoT device during the first connection, the network parameters of the AP including a service set identifier (SSID) and a channel, entering a power saving mode to terminate the first connection with the AP, receiving a wakeup trigger from an IoT sensor communicatively connected with the IoT device, changing from the power saving mode to a wakeup mode, listening in the stored channel until a Beacon signal is received or a predetermined time duration has passed while operating in the wakeup mode, upon receiving the Beacon signal, comparing the stored SSID with an SSID contained in the Beacon signal, and in response to a comparison result that the stored SSID matches with the SSID contained in the Beacon signal, establishing a second connection with the AP based on the Beacon signal.

In one aspect, an IoT device is provided. The IoT device may include a processor and a memory. The memory stores instructions that, when executed by the processor, configure the IoT device to establish a first connection with an AP, store network parameters of the AP in the memory of the IoT device during the first connection, the network parameters of the AP including a SSID and a channel, enter a power saving mode to terminate the first connection with the AP, receive a wakeup trigger from an IoT sensor communicatively connected with the IoT device, change from the power saving mode to a wakeup mode, listen in the stored channel until a Beacon signal is received or a predetermined time duration has passed while operating in the wakeup mode, upon receiving the Beacon signal, compare the stored SSID with an SSID contained in the Beacon signal, and in response to a comparison result that the stored SSID matches with the SSID contained in the Beacon signal, establish a second connection with the AP based on the Beacon signal.

In one aspect, a non-transitory computer-readable storage medium is provided. The computer-readable storage medium includes instructions that when executed by an IoT device, cause the IoT device to establish a first connection with an AP, store network parameters of the AP in the memory of the IoT device during the first connection, the network parameters of the AP including a SSID and a channel, enter a power saving mode to terminate the first connection with the AP, receive a wakeup trigger from an IoT sensor communicatively connected with the IoT device, change from the power saving mode to a wakeup mode, listen in the stored channel until a Beacon signal is received or a predetermined time duration has passed while operating in the wakeup mode, upon receiving the Beacon signal, compare the stored SSID with an SSID contained in the Beacon signal, and in response to a comparison result that the stored SSID matches with the SSID contained in the Beacon signal, establish a second connection with the AP based on the Beacon signal.

BRIEF DESCRIPTION OF THE DRAWINGS

To easily identify the discussion of any particular element or act, the most significant digit or digits in a reference number refer to the figure number in which that element or act is first introduced.

FIG. 6 is a flowchart illustrating operations of an IoT device in handling IP conflicts during fast reconnection, in accordance with some example embodiments.

FIG. 8 is a flowchart illustrating operations of an IoT device in handling the situation when the gateway/DNS parameters change since initial connection, in accordance with some example embodiments.

DETAILED DESCRIPTION

Figure 1:
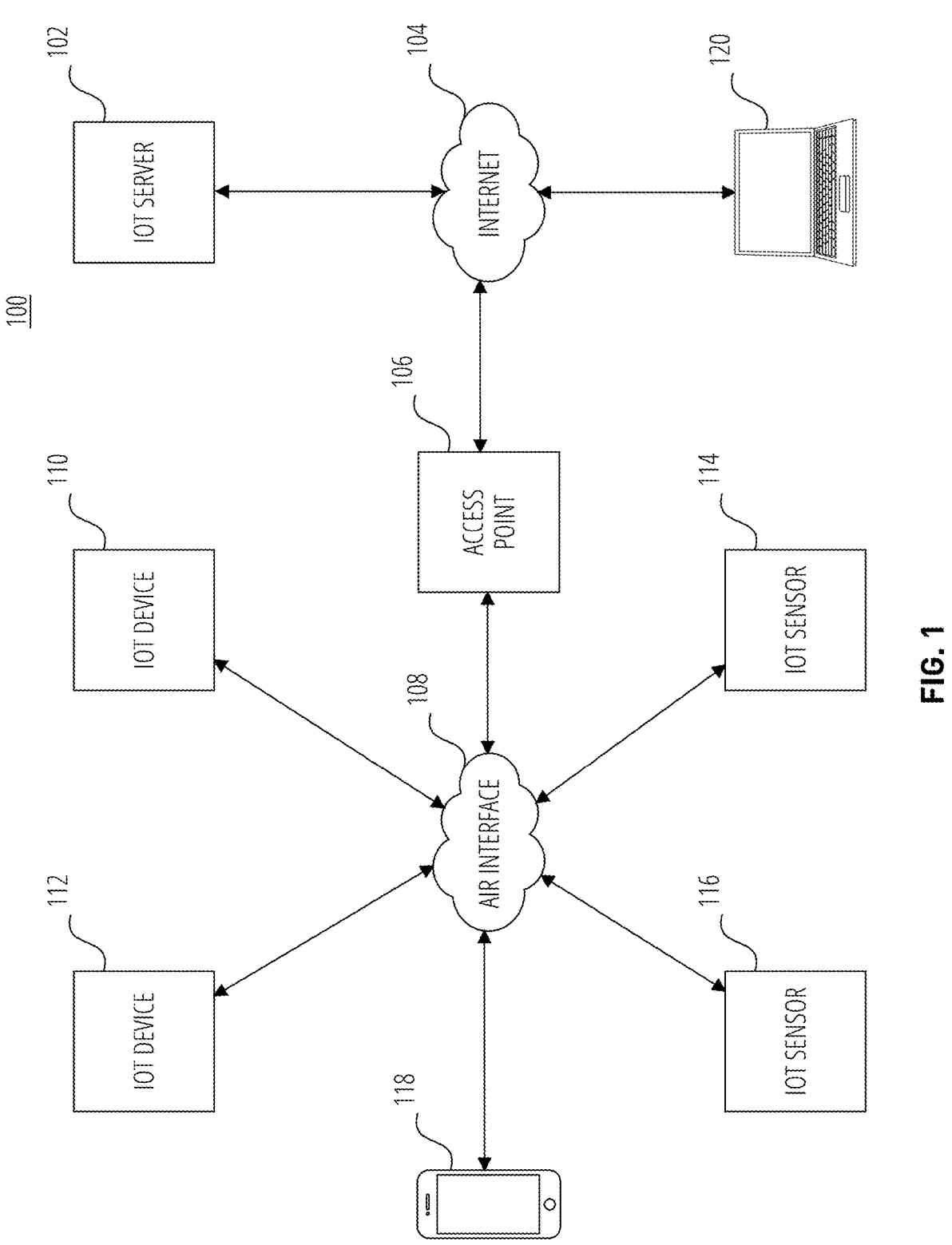
FIG. 1 is a block diagram illustrating an internet of things (IoT) system, in accordance with some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As mentioned above, when a user attempts to use a sleeping IoT device that has disconnected from its original wireless connection, there is usually a latency of exceeding 3 seconds before the IoT device can reconnect to the network and respond to the user's request, greatly degrading user experience. Therefore, a method for fast network reconnection is desirable.

The present disclosure provides systems and methods for fast reconnection of an IoT device to a previously connected AP using stored network parameters. In summary, an IoT device can store network parameters of an AP during initial connection, including the Service Set Identifier (SSID), password, channel, IP address, gateway setting, Domain Name System (DNS) settings, etc. When the IoT device wakes up from sleep mode, it can read these stored parameters and quickly re-authenticate and reconnect with the AP.

Specifically, during an initial connection between the IoT device and the AP, the IoT device may perform a full channel scan to detect available APs. The IoT device may select a target AP from the detected APs based on user input of SSID and password. The IoT device can calculate a Pre-Shared Key (PSK) based on the SSID, the length of the SSID, and/or the password and use the PSK to establish the connection with the AP. The IoT device may execute a DHCP to obtain an allocated IP address and other network connection details (e.g., gateway settings, DNS settings). All network parameters can be stored in a memory (e.g., a flash memory) of the IoT device to facilitate future reconnections. The IoT device may enter a power-saving sleep mode while not in operation and deactivate its wireless communication component (e.g., transceiver), hence terminating the initial connection.

When the IoT device receives a wakeup trigger while operating in the sleep mode, the IoT device may switch from the sleep mode into a wakeup mode or an active mode. The wakeup trigger can be caused based on a physical interaction by a user with an IoT sensor (e.g., a doorbell) connected to the IoT device. After switching to the wakeup mode or the active mode, the IoT device listens on the stored channel for a Beacon signal. If the SSID contained in the Beacon signal matches with the stored SSID, the IoT device determines that the Beacon signal is broadcasted from the original AP and transmits the stored PSK to the AP without needing to recalculate it, saving significant time. When the PSK is authenticated, the IoT device can establish a connection with the AP. If the AP is unencrypted, the IoT device can establish a connection directly.

Then, the IoT device can utilize the stored static IP address, gateway settings, and DNS settings to restore network connectivity with internal/external devices via the AP. If another device has taken the stored static IP address of the IoT device or the AP dynamically allocates IP addresses, the IoT device can execute a DHCP to obtain a new IP address. DHCP is a network management protocol that asks AP to lease or assign IP addresses to connected devices and provides network configuration details. The network configuration details can include gateway settings and DNS settings. The IoT device can detect if the AP's gateway or DNS settings have changed since the initial connection and reacquire updated parameters through the DHCP if needed. The new IP address, gateway settings, and DNS settings can overwrite the previously stored values in the memory of the IoT device. If the SSID contained in the Beacon signal doesn't match with the stored SSID, the IoT device may continue to listen in the stored channel for a preset duration. After the preset duration has passed, the IoT device can perform a full-channel scan to discover the Beacon signal from the AP.

Following are some example application scenarios of the present disclosure, but they are not limiting:

1. After detecting that a user presses a smart doorbell, a smart IoT device fast reconnects to a home Wi-Fi router to transmit a notification to an indoor device or a user device.
2. After detecting that a user presses a smart call button, a smart IoT device fast reconnects to a home Wi-Fi router to establish a unidirectional or bidirectional video or audio call with an indoor receiver or a user device.
3. After detecting that a user touches a display of an equipment (e.g., a smart treadmill, a smart TV, etc.) while the equipment is sleeping, the equipment reconnects to a Wi-Fi router to receive contents (e.g., advertisements) from a server and present the contents.

The present disclosure potentially has at least the following advantages:

1. Reduces latency in reconnection from over 3 seconds to under 1 second, providing much faster wakeup response times.
2. Enhances reliability and robustness of IoT systems by handling various cases like IP address conflicts, changes in AP settings, etc., through automated fallback mechanisms.
3. Provides broad compatibility with the existing Wi-Fi protocol and networking infrastructure without requiring specialized hardware requirements or new network protocols.

FIG. 1 is a block diagram illustrating an Internet of Things (IoT) system 100, in accordance with some example embodiments.

The IoT server 102 serves as the backbone of the IoT system 100, managing data and coordinating communication among other devices in the IoT system 100. The IoT server 102 collects, processes, and stores data transmitted from IoT devices 110 and 112 and IoT sensors 114 and 116.

It also performs tasks such as device management, data analytics, and security enforcement, ensuring smooth operation, and valuable insights from collected data. For example, the IoT server 102 may receive an instruction from the monitor device 120 via the Internet 104 and follow the instruction to manage the IoT device 110 to perform a specific task.

The Internet 104 is a network that allows devices in the IoT system 100 to communicate and exchange data. The Internet 104 provides a pathway for data to travel from IoT devices 110 and 112 and IoT sensors 114 and 116 to the IoT server 102, and vice versa. The Internet 104 also enables remote management, data analysis, and over-the-air updates to the IoT devices. It should be noted that the internet 104 may be combined with or replaced with another type(s) of network.

The AP 106 serves as a bridge between devices (e.g., IoT devices 110 and 112 and IoT sensors 114 and 116) and the Internet 104. It enables devices to connect to the Internet 104 wirelessly through, e.g., Wi-Fi, and facilitates data transfer between these devices and the IoT server 102.

In some examples, when the IoT devices 110 and 112 are connected to the AP 106, network parameters such as the IoT devices' assigned IP address, the Domain Name System (DNS) server settings, and gateway settings may be stored. Specifically, the IP address is a numeric identifier assigned to each device to be uniquely identified on the local network. The DNS converts domain names to corresponding IP addresses to route traffic. The gateway settings refer to the configuration of the AP that connects the air interface 108 to the Internet 104. The present disclosure allows these parameters, along with credentials for the AP 106 itself, to be stored during an initial connection so that IoT devices can reconnect to the same AP 106 by restoring previously established networking configurations in milliseconds when waking from sleep.

The air interface 108 refers to the radio frequency spectrum used for wireless communication between the AP 106 and the IoT devices 110 and 112 and/or IoT sensors 114 and 116. It comprises the standards, protocols, and technologies that define how data is formatted and transmitted wirelessly. For example, the air interface 108 may employ a Wi-Fi network under an IEEE 802.11 standard. Alternatively, or additionally, the air interface 108 may employ Bluetooth, ZigBee, Z-Wave, LPWAN, RFID, NFC, etc.

The IoT devices 110 and 112 are physical devices, such as appliances, machines, or gadgets, that are equipped with the necessary hardware and software to perform specific tasks. They interact with the IoT sensors 114 and 116 and communicate with the IoT server 102 through the AP 106 and the Internet 104. The IoT devices 110 and 112 may each include a processor, a transceiver, and/or a memory. The transceiver sends and receives wireless signals to facilitate communication over the air interface 108. For example, during the initial connection, the transceiver exchanges data packets with the AP 106 to obtain credentials and network parameters. The processor may be configured to execute computer-readable instructions stored in the memory to perform various functions and operations of the IoT device. For example, the processor may collect sensor data, communicate with other devices over the network, execute local analytics algorithms, control mechanical components, etc. The memory may store the computer-readable instructions, firmware, software, operating parameters, network credentials, collected sensor data, and other information that enables the functionality of the IoT device. The memory may be volatile or non-volatile. In some examples, the memory is a non-volatile flash memory.

In an example fast reconnection process, these components coordinate as follows: During initial association, the processor calculates a PSK value, the transceiver performs a full-channel scan and transmits the PSK value to scanned AP to establish a communication with it. The processor stores network parameters in the memory. Later, when waking up from sleep, the processor retrieves these credentials from the memory and provides them to the transceiver, allowing and controlling the transceiver to send connection requests directly to the AP 106. Once verified based on the provided credentials, communication is restored in hundreds of milliseconds.

The IoT sensors 114 and 116 are devices or modules that detect changes in the environment or system and convert these changes into data that can be understood and used by the IoT devices 110 and 112 or the IoT server 102. These sensors can monitor various parameters, like temperature, humidity, pressure, light, motion, or other environmental factors. The IoT sensors 114 and 116 may include a doorbell, a microphone, and/or a camera sensor, but they are not limiting.

The user device 118 is a portable device, such as a smartphone or tablet, that can interact with the IoT system. It can be used to monitor, control, or configure the IoT devices 110 and 112 remotely. It communicates with the IoT server 102 over the Internet 104, allowing users to interact with the IoT system 100 from anywhere.

The monitor device 120 is a device specifically designed to observe and display information from the IoT system 100. This could be a dedicated display showing data collected by the IoT sensors 114 and 116, or it could be a computer used by system administrators to manage the IoT system 100. It provides real-time or historical data visualization, allowing for effective system monitoring and troubleshooting.

It should be noted that the present disclosure is not limited to an IoT system with a Wi-Fi network under IEEE 802.11 standard. Instead, the present disclosure may be used in any other same or different types of systems with the same or different types of network environment. Such application is within the protective scope of the present disclosure.

Figures 2A, 2B:
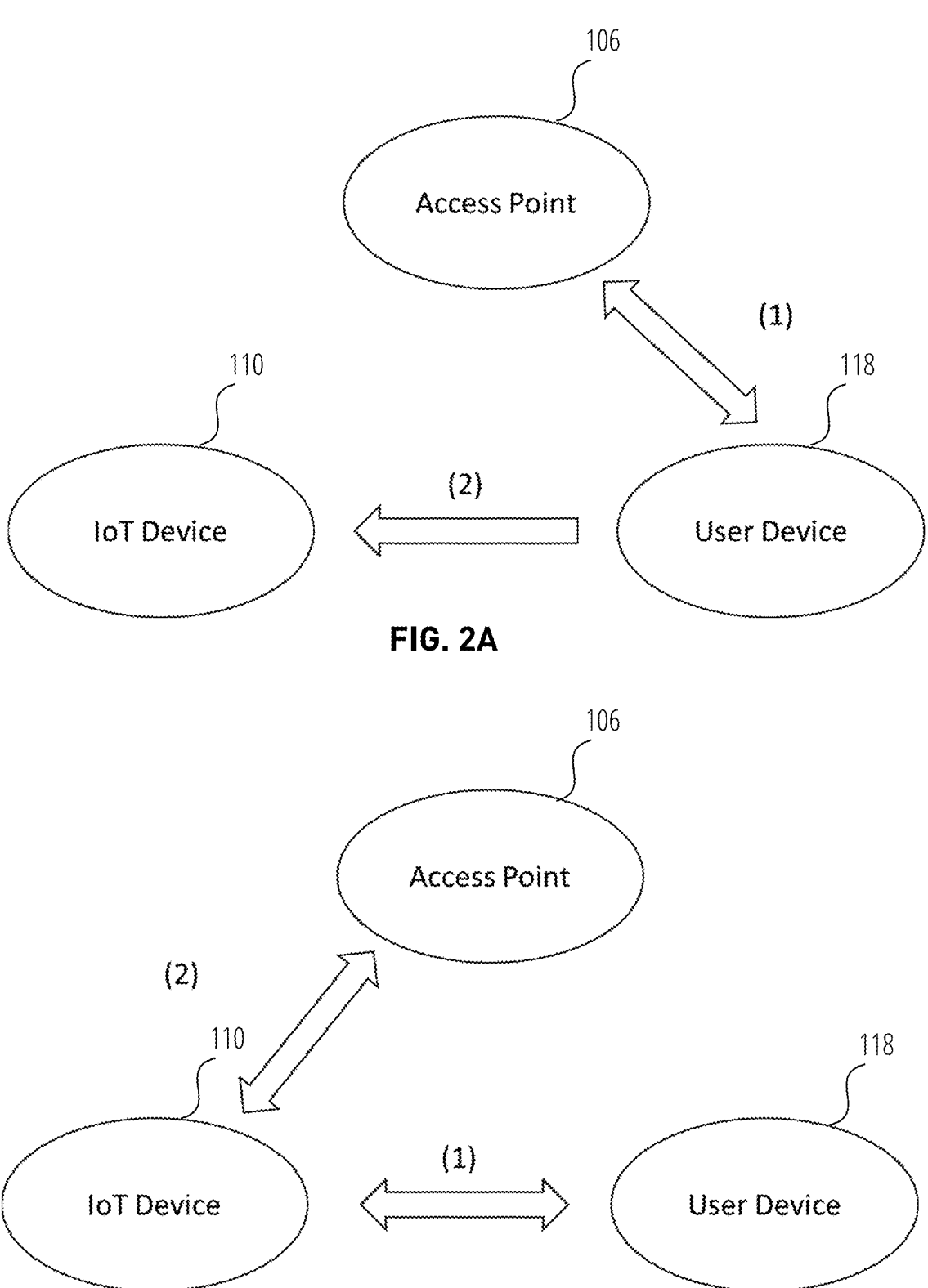
FIGS. 2A-2B are schematic diagrams illustrating example ways of establishing a first connection between the IoT device and the AP, in accordance with some example embodiments.

FIGS. 2A-2B are schematic diagrams illustrating example ways of establishing an initial connection between the IoT device (e.g., IoT devices 110 and 112) and the AP (e.g., AP 106), in accordance with some example embodiments.

As shown in FIG. 2A, a user device 118, such as a mobile phone, may first connect to the AP 106. Specifically, the user device 118 may perform an all-channel scan, checking each available channel. This scan can discover nearby Wi-Fi network signals and their corresponding APs' SSIDs. The user device 118 may display a list of the SSIDs on a display thereof. From the list of detected SSIDs, the user device 118 or a user of the user device 118 may select the target AP 106 for connection. The user may also input, via a user interface of the user device 118, a password or passphrase for the selected AP 106 into the user device 118. Based on the AP 106's SSID, the length of the SSID, and the provided password, the user device 118 can generate a pre-shared key (PSK) value for authentication. Based on different encryption methods, different key values can be calculated using different algorithms, but they are all within the protection scope of the present disclosure. The user device 118 transmits the generated PSK value to the AP 106. Upon verification of the PSK value, the AP 106 establishes a secured Wi-Fi connection with the user device 118. Then, the user device 118 may request additional networking details from the AP 106 using a Dynamic Host Configuration Protocol (DHCP). The DHCP may include an interaction of four steps: Discover, Offer, Request, and Acknowledgement. In the Discover step, the user device 118 may broadcast a Discover message to find the AP 106. In the Offer step, the AP 106 responds with an Offer message, proposing IP addresses. In the Request step, the user device 118 selects an IP and broadcasts a Request message to accept it. In the Acknowledgement step, the AP 106 sends an Acknowledgement to confirm the IP lease. The AP 106 may assign and return parameters like IP addresses, gateway settings, DNS settings, etc., to the user device 118. The user device 118 may store these parameters together with credentials of the AP 106 (e.g., SSID, password, PSK value, etc.) locally.

The user device 118 may establish a second connection with the IoT device. The second connection may be established via the same or different network from the first connection between the user device 118 and the AP 106. Through the second connection, the user device 118 may transmit the stored network parameters to the IoT device 110. The IoT device 110 can persistently save these network parameters to internal storage memory. With the SSID, password, PSK value, IP address, gateway, DNS, and other network parameters persistently saved locally, the IoT device 110 can rapidly reconnect to AP 106 upon waking up.

Specifically, the IoT device 110 may listen on the stored channel, waiting to detect Beacon frames broadcasted by AP 106 that contains its SSID. Upon receiving a Beacon frame, the IoT device 110 can compare the frame's SSID value with the locally stored SSID. If the SSIDs match, the IoT device 110 can immediately initiate authentication by conveying the stored PSK value to the AP 106. Further, with locally cached network configurations, the IoT device 110 can skip additional DHCP requests to obtain IP addresses from the AP 106. Instead, the IoT device 110 may directly apply the saved static IP address, gateway settings, and DNS server settings to reconnect to the network immediately through AP 106 without waiting for parameter assignment delays in the DHCP.

Alternatively, as shown in FIG. 2B, the user device 118 may directly guide the IoT device 110 to connect to the Access Point (AP) 118 instead of facilitating the connection itself.

Specifically, the user device 118 first connects with the IoT device 110 over a network such as Bluetooth, Wi-Fi, etc. An application installed on the user device 118 can then receive user's instructions to scan available wireless channels for nearby network signals. From the list of discovered SSIDs broadcasted by APs, a user can select the target AP for the IoT device 110 to connect to, which is AP 106 in this example. The user may also input the password or passphrase of the chosen AP 106 into the application via a user interface. The user device 118 conveys this target SSID and password over the network to the IoT device 110.

Applying the received credential information, the IoT device 110 can initiate authentication with the AP 106 by transmitting a PSK value calculated based on the SSID, the length of the SSID, and the password. Upon verification of the PSK, the AP 106 establishes a secured connection with the IoT device 110. While connected, the IoT device 110 may request and obtain additional network configuration details, such as IP addresses, gateway settings, and DNS settings, from the AP 106 using DHCP. The IoT device 110 stores these SSID, password, channel, PSK value, IP addresses, gateway settings, DNS settings, and other network parameters locally in a non-volatile memory. The stored parameters allow the IoT device 110 to rapidly reconnect to the previously connected AP 106 when waking up from sleep mode by using the stored data rather than performing lengthy scanning and authentication processes.

Figure 3:
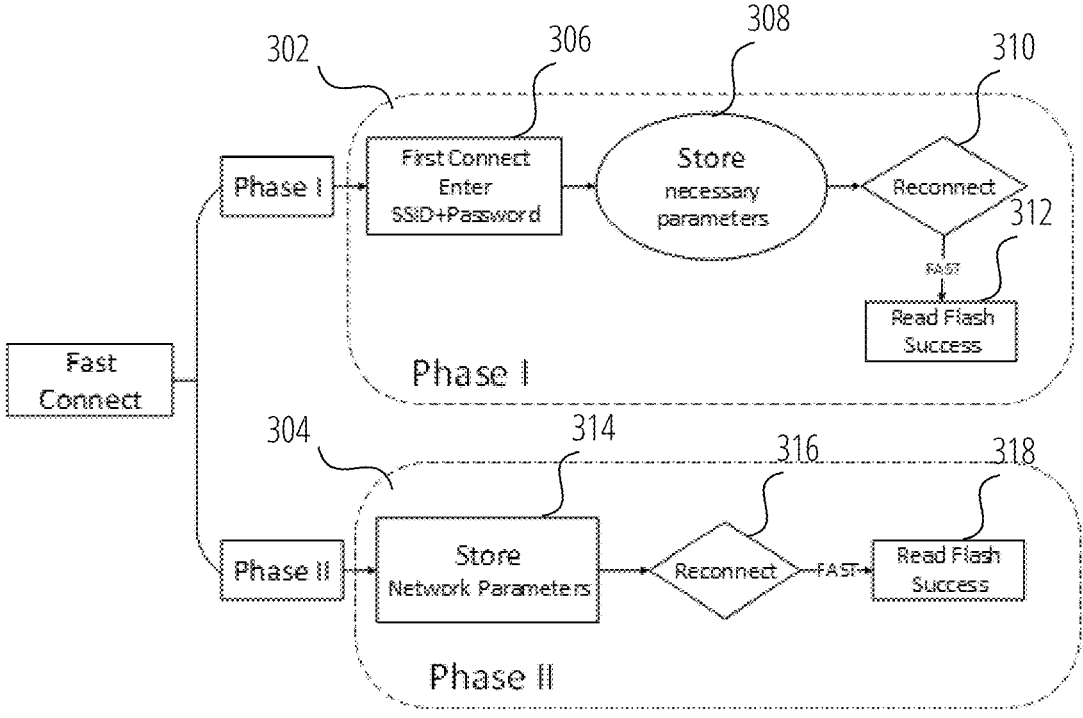
FIG. 3 is a schematic diagram illustrating two phases of fast connection, in accordance with some example embodiments.

FIG. 3 is a schematic diagram illustrating two phases, 302 and 304, of fast connection of an IoT device (e.g., IoT device 110, IoT device 112) with an AP (e.g., AP 106), in accordance with some example embodiments.

In Phase 1 (302), the IoT device 110 (or IoT device 112) does not yet have the credentials of the AP 106. In step 306, the user device 118 connects with the AP 106 and sends network parameters to the IoT device 110, or directly guides the IoT device 110 to connect with the AP 106 via an application installed on the user device 118. In step 308, as a part of the first connection, network credentials and configuration details like SSID, password key, PSK value, channel, IP address, gateway settings, DNS settings, etc., are stored in a memory (e.g., a non-volatile flash memory) on the IoT device 110. In step 310, when the IoT device 110 wakes up or reboots, the IoT device 110 determines whether it wants to reconnect to the same AP 106. If so, the IoT device 110 may read the stored network credentials and configurations and use them to reconnect to the AP 106.

Later, in Phase 2 (304), the IoT device 110 can directly use these saved parameters to reconnect with the AP 106 after waking from sleep mode or rebooting. Steps 314, 316, and 318 are similar to steps 308, 310, and 312, respectively, and are therefore not described again.

Figure 4:
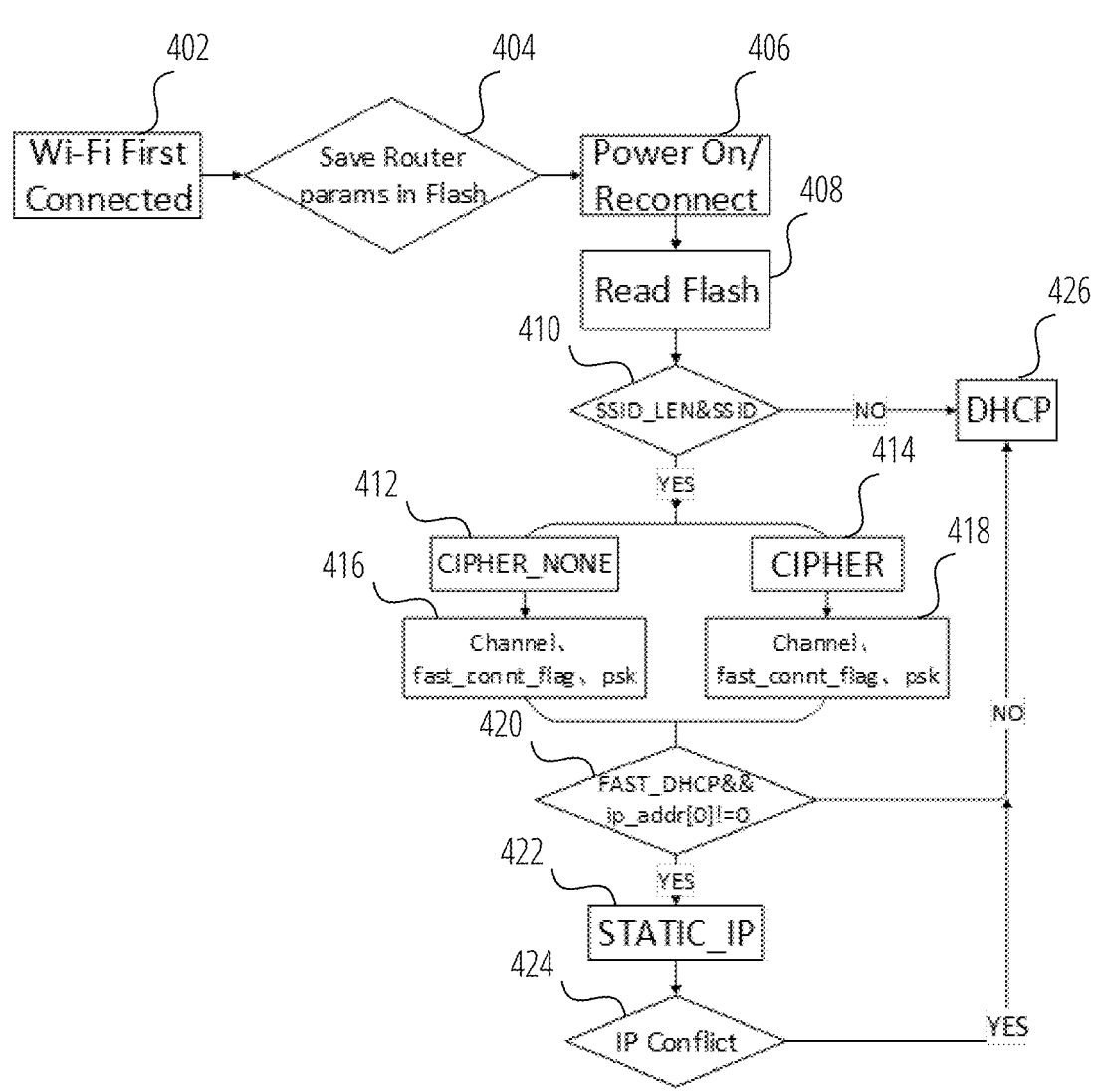
FIG. 4 is a flowchart illustrating operations of an IoT device in reconnecting with an AP device, in accordance with some example embodiments.

FIG. 4 is a flowchart illustrating operations of an IoT device (e.g., IoT device 110, IoT device 112) in reconnecting with a previously associated AP (e.g., AP 106), in accordance with some example embodiments.

In step 402, the IoT device may first connect to the AP. In step 404, the IoT device may store parameters in its flash memory. The parameters may include SSID, password, PSK value, channel, IP address, etc. When the IoT device is not operating, it may enter a sleep mode or shut down to save power. In step 406, the IoT device powers back on or wakes up to reconnect. In step 408, the IoT device reads the parameters stored in flash. In step 410, the IoT device may determine whether the SSID and the length of the SSID match with those in received Beacon signals. If the SSIDs match, method 400 proceeds to steps 412 or 414, depending on whether the AP is ciphered; otherwise, method 400 proceeds to an all-channel scan. If the AP is ciphered (414), the IoT device may read the stored channel, fast connection flag, and PSK value in step 418. The PSK value is used for authentication. If the AP is not ciphered (412), the IoT device may read the stored channel and fast connection flag in step 416. In step 420, the IoT device may determine whether it stores a static IP address. If it stores a static IP address (422), the IoT device may determine whether there is an IP conflict in step 424; otherwise, the IoT device may proceed to perform DHCP in step 426. If there is an IP conflict, the IoT device may proceed to perform DHCP in step 426.

Figure 5:
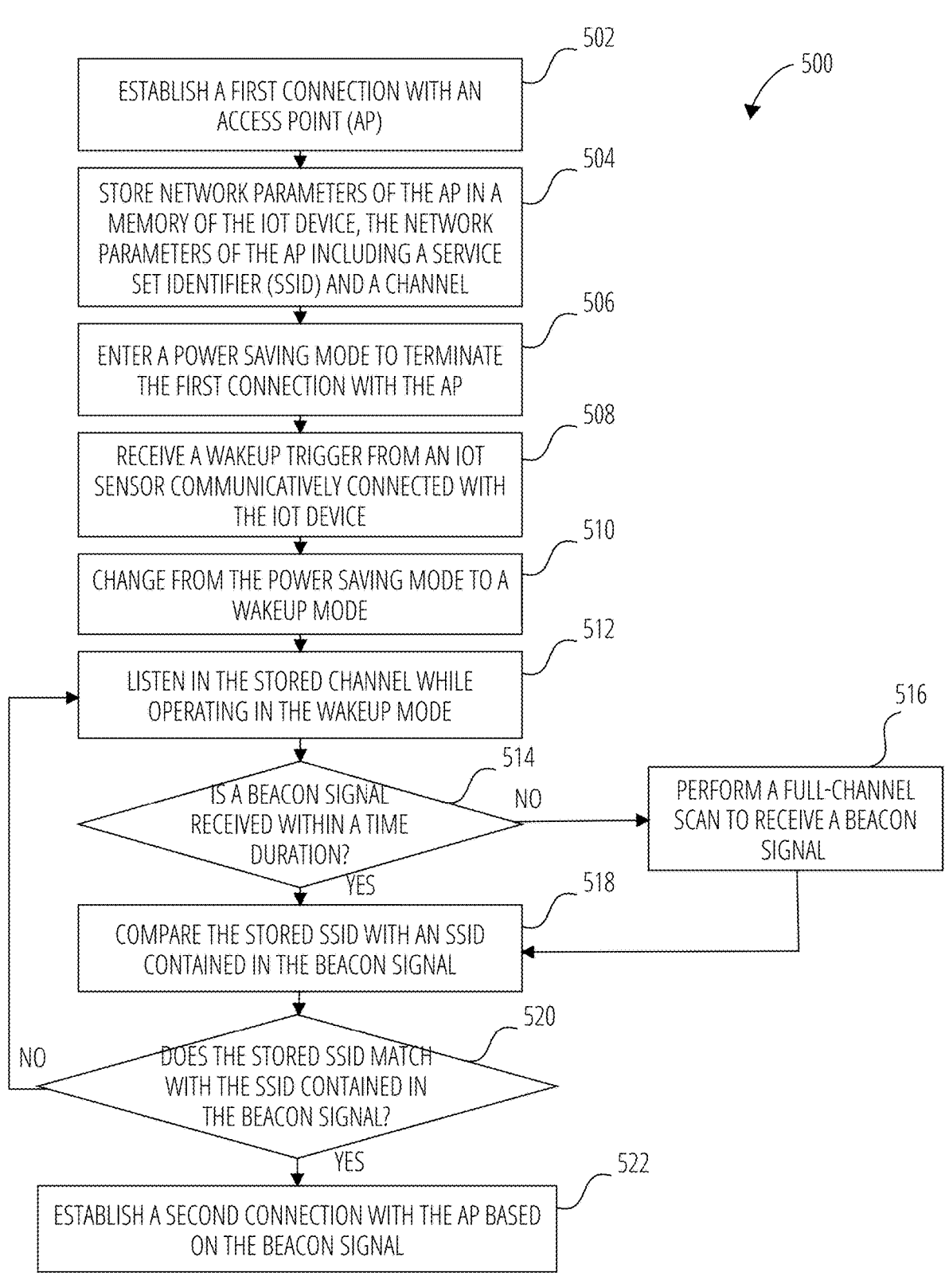
FIG. 5 is a flowchart illustrating operations of an IoT device in reconnecting with an AP device, in accordance with some example embodiments.

FIG. 5 is a flowchart illustrating operations of an IoT device (e.g., IoT device 110, IoT device 112) in reconnecting with an AP device (e.g., AP 106), in accordance with some example embodiments. The method 500 may be embodied in computer-readable instructions for execution by one or more processors such that operations of the method 500 may be performed in part or in whole by the functional components of the IoT device 110 (or IoT device 112); accordingly, the method 500 is described below by way of example with reference thereto. However, it shall be appreciated that at least some of the operations of the method 500 may be deployed on various other hardware configurations than the IoT device 110. Also, the operations of the method 500 may be partially omitted, or performed in any order.

In operation 502, the IoT device may establish a first wireless connection with the AP. Specifically, a transceiver of the IoT device may perform a full-channel scan to detect Beacon signals (Beacon frames) broadcasted by nearby APs. The transceiver of the IoT device may sweep across frequency ranges to search for the Beacon signals, e.g., scanning through some or all of the 13 channels of the 2.4 GHz band and/or the 24 channels of the 5 GHz band. When the target AP's Beacon signal is identified, the IoT device then negotiates credentials and network parameters using authentication schemes like WPA2-PSK and protocols like DHCP, as described elsewhere in the present disclosure.

In operation 504, network parameters discovered through initial connection like SSID, password key, channel, IP address, gateway/DNS settings, and other configurations may be stored in the IoT device's non-volatile memory or flash storage for persistence across power cycles. For example, the channel number corresponding to the frequency where the AP was detected could be saved to accelerate scans in later reconnection.

In operation 506, after finishing the initial network configuration and when there are no active tasks, the IoT device may terminate the wireless connection with the AP and enter a low-power sleep mode. During the sleep mode, the IoT device either completely turns off its transceiver, or only wakes it up infrequently to check for incoming wireless packets.

In operation 508, the IoT device may receive a wakeup trigger, indicating that the IoT device now needs to wake up and rejoin the wireless network from the sleep mode. This wakeup trigger may originate from various sources. For example, a user physically interacting with the IoT device's connected sensors (e.g., buttons, doorbells) could generate the wakeup trigger. Detection of motion or other environmental stimuli by the IoT sensors could also automatically generate the wakeup trigger to activate the IoT device. As another example, timed alarms or scheduled requests for the IoT device to provide sensor information to destination servers or user devices may generate the wakeup trigger. However, these examples are not limiting. Other kinds of wakeup triggers are possible and within the protection scope of the present disclosure.

In operation 510, the IoT device may change from the sleep mode to a wakeup mode. The wakeup mode doesn't necessarily mean that the IoT device stays awake continuously. Instead, during the wakeup mode, the IoT device may check incoming Beacon signals more frequently and sleep for shorter durations than in sleep mode.

In operation 512, while in wakeup mode, the IoT device adjusts the transceiver's frequency components to match the frequency of the stored channel where the target AP was originally discovered, and listens at the adjusted frequency/channel. The IoT device listens for periodical beacon broadcast frames sent by the AP to confirm whether the AP is still available at that channel.

In operation 514, the IoT device may determine whether a Beacon frame is received within a predetermined time duration. The predetermined time duration can be 100 ms, 200 ms, 500 ms, 1 s, etc. In response to a determination that no Beacon frame is received within the time duration, the method 500 proceeds to operation 516; otherwise, the method 500 proceeds to operation 518.

In operation 516, the transceiver of the IoT device may perform a full-channel scan like in the first connection.

Specifically, the transceiver scans across all channels, listening for fixed intervals on each channel to receive Beacon signals.

In operation 518, the IoT device may compare the stored SSID with an SSID contained in the Beacon signal.

In operation 520, the IoT device may determine whether the SSIDs match. In response to a determination that the SSIDs do not match, the method 500 proceeds back to operation 512 to keep listening for additional Beacon frames; otherwise, the method 500 proceeds to operation 522.

In operation 522, the IoT device may reconnect to the AP, using the stored network parameters, without needing to rediscover or reauthenticate.

FIG. 6 is a flowchart illustrating operations of an IoT device (e.g., IoT device 110, IoT device 112) in handling IP conflicts during fast reconnection, in accordance with some example embodiments. The method 600 may be embodied in computer-readable instructions for execution by one or more processors such that operations of the method 600 may be performed in part or in whole by the functional components of the IoT device 110 (or IoT device 112); accordingly, the method 600 is described below by way of example with reference thereto. However, it shall be appreciated that at least some of the operations of the method 600 may be deployed on various other hardware configurations than the IoT device 110. Also, the operations of the method 600 may be partially omitted, or performed in any order.

In operation 602, the IoT device establishes the second connection with the AP by directly applying the static IP address previously assigned during the first connection. The static IP address was stored in the IoT device's non-volatile memory. Using the stored IP address allows immediate restoration of network connectivity without needing to rediscover network configuration.

In operation 604, while communicating with the AP using the stored static IP address, the IoT device may detect an address conflict, indicating the stored IP address is no longer valid. This could be due to AP's reconfiguration, such as reboot. For example, the AP may have reconfigured its DHCP pool after rebooting and allocated the stored address to another device.

In response to the detected IP conflict, in operation 606, the IoT device executes the Dynamic Host Configuration Protocol (DHCP) to acquire a new IP configuration from the AP, including an updated, non-conflicting network address.

Using the newly allocated IP address, in operation 608, the IoT device may reestablish the second connection with the AP. With the updated IP address, the IoT device can communicate with the AP or other devices via the AP.

In operation 610, the IoT device updates its locally stored static IP address, overwriting the previous configuration with the newly assigned IP address. This ensures the persistence of valid network credentials for future reconnections. The IoT device may utilize DHCP to periodically renew the IP configurations if needed.

Figure 7:
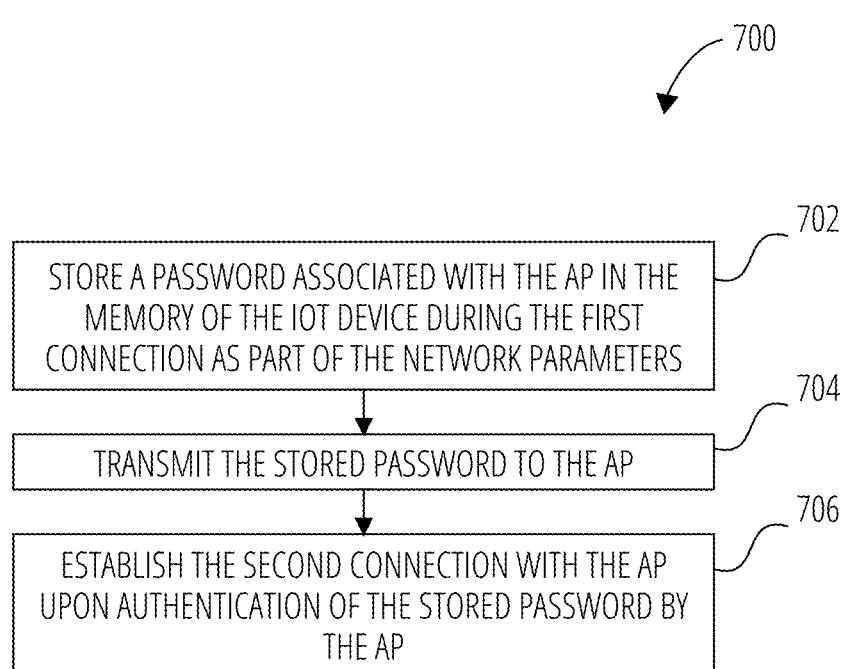
FIG. 7 is a flowchart illustrating operations of an IoT device in utilizing a stored password to authenticate with the AP during fast reconnection, in accordance with some example embodiments.

FIG. 7 is a flowchart illustrating operations of an IoT device in utilizing a stored password to authenticate with the AP during fast reconnection, in accordance with some example embodiments. The method 700 may be embodied in computer-readable instructions for execution by one or more processors such that operations of the method 700 may be performed in part or in whole by the functional components of the IoT device 110 (or IoT device 112); accordingly, the method 700 is described below by way of example with reference thereto. However, it shall be appreciated that at least some of the operations of the method 400 may be deployed on various other hardware configurations than the IoT device 110. Also, the operations of the method 700 may be partially omitted, or performed in any order.

In operation 702, during the first connection, the IoT device may store password associated with the AP for later reuse when reconnecting. The password can take various forms depending on the encryption method predetermined by the AP. For example, if WPA2-Personal is used, the IoT device may store an 8-63 character alphanumeric passcode entered by a user as the password. Alternatively, the IoT device may store a 256-bit pre-shared key (PSK) as the password. The PSK can be generated based on the SSID, the length of the SSID, and the user-entered password using a PBKDF2 key derivation function. If WPA2-Enterprise authentication mechanisms like EAP-TLS are supported, the password can include a client certificate and private key pair installed on the IoT device. In some examples, the password can also include identities, certificates, and authentication protocol selections. In general, any parameter used to rebuild secured connections with the AP can be considered part of the password information in operation 702.

In operation 704, when attempting to reestablish the second connection, the IoT device transmits the previously stored password back to the AP. This could include a pre-shared key, client certificate, identity assertion, or other authentications. The AP may receive the password and validate whether the password matches with access permissions or is valid.

In operation 706, if the authentication completes successfully, indicating the stored password is still valid, the AP may permit the second connection with the IoT device. The IoT device can then use stored parameters to reestablish encrypted connections with the AP.

FIG. 8 is a flowchart illustrating operations of an IoT device in handling the situation when the gateway/DNS parameters change since the initial connection, in accordance with some example embodiments. The method 800 may be embodied in computer-readable instructions for execution by one or more processors such that operations of the method 800 may be performed in part or in whole by the functional components of the IoT device 110 (or IoT device 112); accordingly, the method 800 is described below by way of example with reference thereto. However, it shall be appreciated that at least some of the operations of the method 800 may be deployed on various other hardware configurations than the IoT device 110. Also, the operations of the method 800 may be partially omitted, or performed in any order.

In operation 802, the IoT device may store gateway settings and/or DNS settings of the AP during the first connection. The gateway settings and/or DNS settings can be stored in a non-volatile memory of the IoT device together with other network parameters.

In operation 804, upon reconnection, the IoT device may determine whether the gateway settings or DNS settings have changed since the last connection when it was originally stored. For example, the AP may have rebooted and reconfigured the gateway/DNS settings. The determination of whether the gateway/DNS settings have changed can include transmitting a data packet using the original settings and checking whether a return data packet can be received. If no return data packet is received, the gateway settings or DNS settings may have changed, and method 800 proceeds to operation 806; otherwise, method 800 proceeds to operation 810.

In operation 806, the IoT device may execute DHCP to acquire updated gateway/DNS settings from the AP. Operation 806 may be combined with operation 604, such that a single DHCP can be performed to obtain both an updated IP address and updated gateway/DNS settings.

In operation 808, the IoT device may update the gateway/DNS settings stored in its non-volatile memory, overwriting previously stored parameters with newly retrieved ones.

In operation 810, the IoT device uses the updated parameters to establish connections with desired destination servers or devices through the AP.

Examples

1. A method at an Internet of Things (IoT) device for network reconnection, the method comprising:
   establishing a first connection with an Access Point (AP);
   storing network parameters of the AP in a memory of the IoT device during the first connection, the network parameters of the AP including a service set identifier (SSID) and a channel;
   entering a power saving mode to terminate the first connection with the AP;
   receiving a wakeup trigger from an IoT sensor communicatively connected with the IoT device;
   changing from the power saving mode to a wakeup mode;
   listening in the stored channel while operating in the wakeup mode until a Beacon signal is received or a predetermined time duration has passed;
   upon receiving the Beacon signal, comparing the stored SSID with an SSID contained in the Beacon signal; and
   in response to a comparison result that the stored SSID matches with the SSID contained in the Beacon signal,
   establishing a second connection with the AP based on the Beacon signal.

2. The method of example 1, further comprising:
   in response to a comparison result that the stored SSID does not match with the SSID contained in the Beacon signal,
   continuing to listen in the stored channel until a next Beacon signal is received or the predetermined time duration has passed.

3. The method of examples 1 or 2, further comprising:
   upon detecting that the predetermined time duration has passed,
   performing a full-channel scan to receive a Beacon signal transmitted by the AP; and
   establishing the second connection with the AP based on the
   Beacon signal.

4. The method of example 3, further comprising:
   updating the stored channel of the AP based on the second connection.

5. The method of any of examples 1-4, wherein the network parameters of the AP further comprise a static IP address, the method further comprising:
   establishing the second connection with the AP using the static IP address.

6. The method of example 5, further comprising:
   detecting an IP conflict while establishing the second connection with the AP using the static IP address;
   executing a Dynamic Host Configuration Protocol (DHCP) to obtain a new IP address; and
   reestablishing the second connection with the AP using the new IP address.

7. The method of example 6, further comprising:
   updating the static IP address based on the new IP
   address.

8. The method of any of examples 1-7, wherein wakeup
   trigger is generated based on a physical interaction with
   the IoT sensor.

9. The method of any of examples 1-8, further comprising:
   storing a password associated with the AP in the
   memory of the IoT device during the first connection
   as part of the network parameters,
   wherein the establishing of the second connection with
   the AP based on the Beacon signal further comprises:
   transmitting the stored password to the AP; and
   establishing the second connection with the AP upon
   authentication of the stored password by the AP.

10. The method of any of examples 1-9, further comprising:
   storing gateway setting or Domain Name System
   (DNS) setting associated with the AP in the memory
   of the IoT device during the first connection as part
   of the network parameters; and
   establishing a connection with an external device
   through the AP using the stored gateway setting or
   the DNS setting.

11. An Internet of Things (IoT) device comprising:
   a processor; and
   a memory storing instructions that, when executed by
   the processor, configure the IoT device to:
   establish a first connection with an Access Point
   (AP);
   store network parameters of the AP in the memory of
   the IoT device during the first connection, the
   network parameters of the AP including a service
   set identifier (SSID) and a channel;
   enter a power saving mode to terminate the first
   connection with the AP;
   receive a wakeup trigger from an IoT sensor com-
   municatively connected with the IoT device;
   change from the power saving mode to a wakeup
   mode;
   listen in the stored channel while operating in the
   wakeup mode until a Beacon signal is received or
   a predetermined time duration has passed;
   upon receiving the Beacon signal, compare the
   stored SSID with an SSID contained in the Beacon
   signal; and
   in response to a comparison result that the stored
   SSID matches with the SSID contained in the
   Beacon signal,
   establish a second connection with the AP based
   on the Beacon signal.

12. The IoT device of example 11, wherein the instruc-
   tions further configure the IoT device to:
   in response to a comparison result that the stored SSID
   does not match with the SSID contained in the
   Beacon signal,
   continue to listen in the stored channel until a next
   Beacon signal is received or the predetermined
   time duration has passed.

13. The IoT device of examples 11 or 12, wherein the
   instructions further configure the IoT device to:
   upon detecting that the predetermined time duration has
   passed,
   perform a full-channel scan to receive a Beacon
   signal transmitted by the AP; and establish the second connection with the AP based on
   the Beacon signal.

14. The IoT device of example 13, wherein the instruc-
   tions further configure the IoT device to:
   update the stored channel of the AP based on the second
   connection.

15. The IoT device of any of examples 11-14, wherein:
   the network parameters of the AP further comprise a
   static IP address; and
   the instructions further configure the IoT device to:
   establish the second connection with the AP using
   the static IP address.

16. The IoT device of example 15, wherein the instruc-
   tions further configure the IoT device to:
   detect an IP conflict while establishing the second
   connection with the AP using the static IP address;
   execute a Dynamic Host Configuration Protocol
   (DHCP) to obtain a new IP address; and
   reestablish the second connection with the AP using the
   new IP address.

17. The IoT device of example 16, wherein the instruc-
   tions further configure the IoT device to:
   update the static IP address based on the new IP
   address.

18. The IoT device of any of examples 11-17, wherein the
   instructions further configure the IoT device to:
   store a password associated with the AP in the memory
   of the IoT device during the first connection as part
   of the network parameters,
   wherein to establish the second connection with the AP
   based on the Beacon signal, the instructions further
   configure the IoT device to:
   transmit the stored password to the AP; and
   establish the second connection with the AP upon
   authentication of the stored password by the AP.

19. The IoT device of any of examples 11-18, wherein the
   instructions further configure the IoT device to:
   store gateway setting or Domain Name System (DNS)
   setting associated with the AP in the memory of the
   IoT device during the first connection as part of the
   network parameters; and
   establish a connection with an external device through
   the AP using the stored gateway setting or the DNS
   setting.

20. A non-transitory computer-readable storage medium,
   the computer-readable storage medium including
   instructions that when executed by an IoT device, cause
   the IoT device to:
   establish a first connection with an Access Point (AP);
   store network parameters of the AP in a memory of the
   IoT device during the first connection, the network
   parameters of the AP including a service set identifier
   (SSID) and a channel;
   enter a power saving mode to terminate the first con-
   nection with the AP;
   receive a wakeup trigger from an IoT sensor commu-
   nicatively connected with the IoT device;
   change from the power saving mode to a wakeup mode;
   listen in the stored channel while operating in the
   wakeup mode until a Beacon signal is received or a
   predetermined time duration has passed;
   upon receiving the Beacon signal, compare the stored
   SSID with an SSID contained in the Beacon signal;
   and
   in response to a comparison result that the stored SSID
   matches with the SSID contained in the Beacon
   signal, establish a second connection with the AP based on
the Beacon signal.

CONCLUSION

The present disclosure provides systems and methods for
fast reconnection of Internet of Things (IoT) devices to a
previously accessed AP after waking from a power-saving
sleep mode. The IoT device stores network parameters of the
AP during initial connection, including Service Set Identifier
(SSID), password, PSK value, channel, IP address, gateway
settings, and Domain Name System (DNS) settings. Upon
receiving a wakeup trigger caused by user interaction with
a connected IoT sensor, the IoT device retrieves the stored
parameters and quickly re-authenticates with the Access
Point utilizing the stored parameters instead of performing
lengthy all-channel scans and PSK calculations. Once
matched and authenticated with the Access Point using the
unchanged SSID and/or PSK values, the IoT device can
immediately restore network connectivity using the stored
IP address and gateway/DNS settings. The system accounts
for potential issues like IP conflicts, gateway/DNS changes,
or Access Point parameter updates through detection and
reacquisition mechanisms. With rapid reconnection enabled,
the IoT device can promptly transmit notifications to indoor
devices, establish latency-sensitive video calls, retrieve
updated contents for display, and support other time-critical
applications requiring a fast response time after waking up
or rebooting.

The present disclosure potentially has at least the follow-
ing advantages: 1. Reduces latency in reconnection from
over 3 seconds to under 1 second, providing much faster
wakeup response times. 2. Enhances reliability and robust-
ness of IoT systems by handling various cases like IP
address conflicts, changes in AP settings, etc. through auto-
mated fallback mechanisms. 3. Provides broad compatibility
with the existing Wi-Fi protocol and networking infrastruc-
ture without requiring specialized hardware requirements or
new network protocols.

What is claimed is:

1. A method at an Internet of Things (IoT) device for
network reconnection, the method comprising:
    establishing a first connection with an Access Point (AP);
    storing network parameters of the AP in a memory of the
        IoT device during the first connection, the network
        parameters of the AP including a service set identifier
        (SSID) and a channel;
    entering a power saving mode to terminate the first
        connection with the AP;
    receiving a wakeup trigger from an IoT sensor commu-
        nicatively connected with the IoT device;
    changing from the power saving mode to a wakeup mode;
    listening in the stored channel while operating in the
        wakeup mode until a Beacon signal is received or a
        predetermined time duration has passed;
    upon receiving the Beacon signal, comparing the stored
        SSID with an SSID contained in the Beacon signal; and
    in response to a comparison result that the stored SSID
        matches with the SSID contained in the Beacon signal,
        establishing a second connection with the AP based on
        the Beacon signal.

2. The method of claim 1, further comprising:
    in response to a comparison result that the stored SSID
        does not match with the SSID contained in the Beacon
        signal,
    continuing to listen in the stored channel until a next
        Beacon signal is received or the predetermined time
        duration has passed.

3. The method of claim 1, further comprising:
    upon detecting that the predetermined time duration has
        passed,
        performing a full-channel scan to receive a Beacon
            signal transmitted by the AP; and
        establishing the second connection with the AP based
            on the Beacon signal.

4. The method of claim 3, further comprising:
    updating the stored channel of the AP based on the second
        connection.

5. The method of claim 1, wherein the network parameters
of the AP further comprise a static IP address, the method
further comprising:
    establishing the second connection with the AP using the
        static IP address.

6. The method of claim 5, further comprising:
    detecting an IP conflict while establishing the second
        connection with the AP using the static IP address;
    executing a Dynamic Host Configuration Protocol
        (DHCP) to obtain a new IP address; and
    reestablishing the second connection with the AP using
        the new IP address.

7. The method of claim 6, further comprising:
    updating the static IP address based on the new IP address.

8. The method of claim 1, wherein wakeup trigger is
generated based on a physical interaction with the IoT
sensor.

9. The method of claim 1, further comprising:
    storing a password associated with the AP in the memory
        of the IoT device during the first connection as part of
        the network parameters,
    wherein the establishing of the second connection with
        the AP based on the Beacon signal further comprises:
    transmitting the stored password to the AP; and
    establishing the second connection with the AP upon
        authentication of the stored password by the AP.

10. The method of claim 1, further comprising:
    storing gateway setting or Domain Name System (DNS)
        setting associated with the AP in the memory of the IoT
        device during the first connection as part of the network
        parameters; and
    establishing a connection with an external device through
        the AP using the stored gateway setting or the DNS
        setting.

11. An Internet of Things (IoT) device comprising:
    a processor; and
    a memory storing instructions that, when executed by the
        processor, configure the IoT device to:
        establish a first connection with an Access Point (AP);
        store network parameters of the AP in the memory of
            the IoT device during the first connection, the net-
            work parameters of the AP including a service set
            identifier (SSID) and a channel;
        enter a power saving mode to terminate the first con-
            nection with the AP;
        receive a wakeup trigger from an IoT sensor commu-
            nicatively connected with the IoT device;
        change from the power saving mode to a wakeup mode;
        listen in the stored channel while operating in the
            wakeup mode until a Beacon signal is received or a
            predetermined time duration has passed;
        upon receiving the Beacon signal, compare the stored
            SSID with an SSID contained in the Beacon signal;
            and in response to a comparison result that the stored SSID matches with the SSID contained in the Beacon signal, establish a second connection with the AP based on the Beacon signal.

12. The IoT device of claim 11, wherein the instructions further configure the IoT device to:

in response to a comparison result that the stored SSID does not match with the SSID contained in the Beacon signal, continue to listen in the stored channel until a next Beacon signal is received or the predetermined time duration has passed.

13. The IoT device of claim 11, wherein the instructions further configure the IoT device to:

upon detecting that the predetermined time duration has passed, perform a full-channel scan to receive a Beacon signal transmitted by the AP; and establish the second connection with the AP based on the Beacon signal.

14. The IoT device of claim 13, wherein the instructions further configure the IoT device to:

update the stored channel of the AP based on the second connection.

15. The IoT device of claim 11, wherein:

the network parameters of the AP further comprise a static IP address; and the instructions further configure the IoT device to:

establish the second connection with the AP using the static IP address.

16. The IoT device of claim 15, wherein the instructions further configure the IoT device to:

detect an IP conflict while establishing the second connection with the AP using the static IP address;

execute a Dynamic Host Configuration Protocol (DHCP) to obtain a new IP address; and reestablish the second connection with the AP using the new IP address.

17. The IoT device of claim 16, wherein the instructions further configure the IoT device to:

update the static IP address based on the new IP address.

18. The IoT device of claim 11, wherein the instructions further configure the IoT device to:

store a password associated with the AP in the memory of the IoT device during the first connection as part of the network parameters, wherein to establish the second connection with the AP based on the Beacon signal, the instructions further configure the IoT device to:

transmit the stored password to the AP; and establish the second connection with the AP upon authentication of the stored password by the AP.

19. The IoT device of claim 11, wherein the instructions further configure the IoT device to:

store gateway setting or Domain Name System (DNS) setting associated with the AP in the memory of the IoT device during the first connection as part of the network parameters; and establish a connection with an external device through the AP using the stored gateway setting or the DNS setting.

20. A non-transitory computer-readable storage medium, the computer-readable storage medium including instructions that when executed by an IoT device, cause the IoT device to:

establish a first connection with an Access Point (AP);

store network parameters of the AP in a memory of the IoT device during the first connection, the network parameters of the AP including a service set identifier (SSID) and a channel;

enter a power saving mode to terminate the first connection with the AP;

receive a wakeup trigger from an IoT sensor communicatively connected with the IoT device;

change from the power saving mode to a wakeup mode;

listen in the stored channel while operating in the wakeup mode until a Beacon signal is received or a predetermined time duration has passed;

upon receiving the Beacon signal, compare the stored SSID with an SSID contained in the Beacon signal; and in response to a comparison result that the stored SSID matches with the SSID contained in the Beacon signal, establish a second connection with the AP based on the Beacon signal.

* * * * *